July 13, 1954 H. C. SIMONS 2,683,591
HEATER
Filed Jan. 18, 1951 3 Sheets-Sheet 1
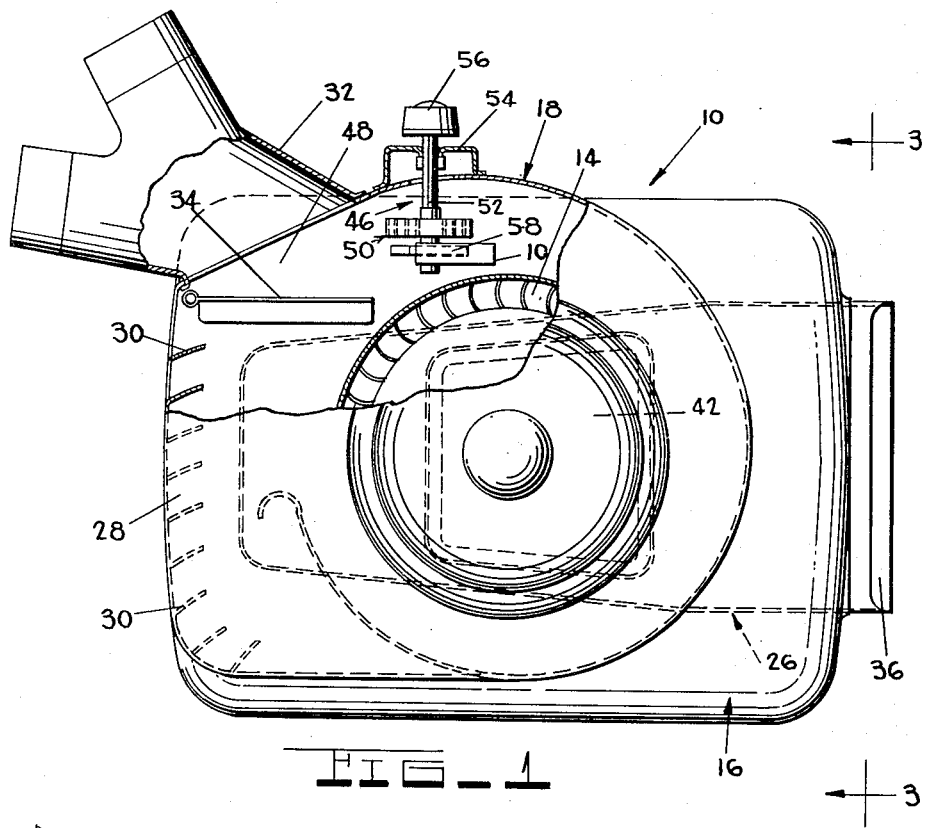
FIG_1
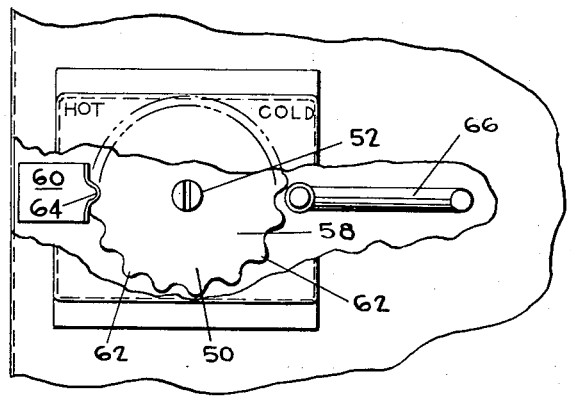
FIG_4
INVENTOR.
HOMER CHARLES SIMONS
BY
ATTORNEYS July 13, 1954
H. C. SIMONS
2,683,591
HEATER
Filed Jan. 18, 1951
3 Sheets-Sheet 2
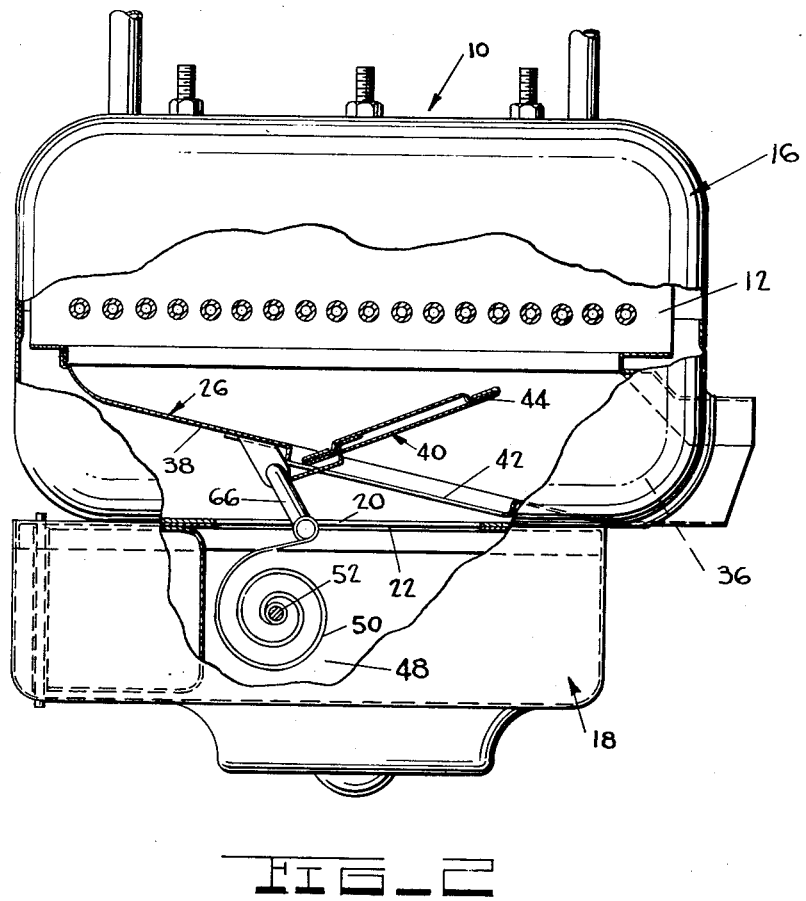
FIG_2
INVENTOR
HOMER CHARLES SIMONS
BY
ATTORNEYS July 13, 1954  H. C. SIMONS  2,683,591
HEATER
Filed Jan. 18, 1951  3 Sheets-Sheet 3
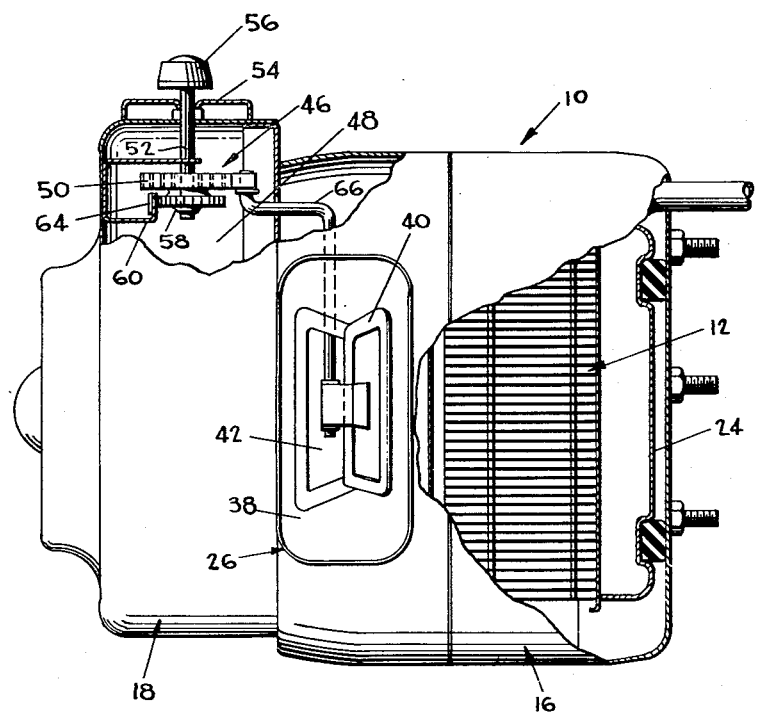
FIG_3
INVENTOR.
HOMER CHARLES SIMONS
BY
ATTORNEYS Patented July 13, 1954

2,683,591

UNITED STATES PATENT OFFICE 2,683,591

HEATER

Homer Charles Simons, Maple Heights, Ohio, assignor to Eaton Manufacturing Company, Cleveland, Ohio, a corporation of Ohio Application January 18, 1951, Serial No. 206,605

2 Claims. (Cl. 257—2)

This invention relates to heating and ventilating and more particularly to a combination heating and ventilating system for automotive vehicles and the like.

Broadly the invention comprehends the provision of a combination heating and ventilating system for automotive vehicles and the like incorporating a thermostatically actuated valve therein for automatically controlling the temperature of the air delivered to the passenger compartment of the vehicle in accordance with the predetermined setting of the thermostat.

Among the objects of the invention is the provision of a combination heating and ventilating apparatus for vehicles that incorporates simple and economical means therein for automatically controlling the air discharged therefrom to a particular desired temperature; that incorporates temperature responsive actuated valve means therein permitting of the passage of all or a portion of unheated air through the heat exchanger of the apparatus or the passage thereof in by-passing relation to the heat exchanger; that incorporates a manual setting thermostat actuated valve positionable through the operation of the thermostat to direct air delivered to the apparatus in desired paths of flow for the temperature controlled condition thereof for delivery to the passenger compartment of the vehicle without any material variation in volumetric flow and that incorporates the thermostat control means for the valve thereof in a chamber where the heated and unheated air passing through the apparatus proper have become thoroughly admixed prior to delivery to the passenger compartment of the vehicle.

Other objects and advantages of the invention will appear from the following description taken in connection with the drawings forming a part of the specification; and in which:

Fig. 1 is a front plan partly broken away view of a heating and ventilating apparatus incorporating a thermostatically actuated valve or door therein;

Fig. 2 is a top plan partly broken away view of the apparatus of Fig. 1;

Fig. 3 is an end plan view partly broken away taken substantially along lines 3—3 of Fig. 1; and Fig. 4 is an enlarged partly broken away view of a portion of the thermostat control means for the valve incorporated in the apparatus.

This heating and ventilating apparatus was devised for the purpose of providing a simple and economical means of providing the automatic delivery of air of a desired temperature to the passenger compartment of a vehicle in which the apparatus is installed. Through the provision of a heater and ventilating apparatus including a two path air heating structure and a pivotal valve controlled opening near the inlet to the two path air heating structure permitting of the controlled by-passing of air around the heater structure if so desired. By so arranging the valve in an appropriate location in the apparatus the unheated air delivered thereto can be made to all pass through the heating structure or be by-passed around the heating structure or it can be delivered in varying proportions through or around the heating structure. The valve in being pivoted between open and closed position provides for a modulation in temperature of the air delivered by the apparatus wherein both the air by-passed around the heater structure and that passed through the heater structure are again joined and admixed for delivery to the passenger compartment. As the air joins up again after passage through and around the heater structure it is delivered to an air blower where it is thoroughly admixed before being discharged to the passenger compartment of the vehicle. It is at the exit from the blower wheel that a suitable air temperature responsive thermostat is located effective through the operation thereof and air discharged into contact with the thermostat to actuate the valve to a desired position in accordance with its manual setting for a desired delivery of air from the apparatus corresponding to the thermostat setting. A thermostat in the form of a bi-metal member provides a suitable economical means which can be easily and properly adjusted for the delivery of air of a desired temperature.

Referring to the drawings for more specific details of the invention 10 represents generally a combination heating and ventilating apparatus of the type basically disclosed in co-pending application Ser. No. 111,436, filed August 20, 1949, and now Patent No. 2,542,317 granted February 20, 1951, adaptable to automotive vehicles and the like comprising basically a heat exchange unit 12, an air propelling device 14, a casing 16 housing the heat exchange unit therein and a scroll 18 for the air propelling device mounted upon the casing 16 in air communicating relation therewith by way of outlet opening 20 in the casing and inlet opening 22 in the scroll. The heat exchange unit 12 is of the two path air flow type wherein the unit is mounted in the casing 16 having a cover or baffle plate 24 completely enclosing one face of the unit and an air flow channel member 26 on its opposite face covering approximately half the face area thereof such that air is permitted to pass through the channel, through a portion of the unit and after passing through said portion of the unit is directed by the plate 24 back through the other portion of the unit substantially surrounding the first air path portion.

After passing through the second air path portion of the heat exchange unit the air exiting therefrom passes out around the exterior surface of the channel member 26 and is discharged from casing 16 through openings 20 and 22 into the central air receiving zone of air propelling device 14, which in this case is preferably a radial flow air blower. The air received by the blower is in turn impelled thereby out of the scroll 18 therefor, for delivery either to the passenger compartment of the vehicle to which the apparatus is adapted through an outlet opening 28 provided in the side and bottom of scroll 18 having a plurality of baffles 30 therein or through air flow defroster ducting 32 controlled as by an air flow control valve 34 therefor.

The channel member 26 provides an air inlet opening 36 and has pivotally arranged in an angular wall 38 thereof a gate or valve 40 movable therein to control an opening 42 provided in wall 38 permitting of the by-pass flow of air as received in inlet opening 36 in the channel member directly therethrough to the air propelling device 14 without the heating thereof. The gate or valve 40 can be moved between full closed position in the wall 38 of channel member 26 and to full open position with the end 44 abutting the face of the heat exchange unit, with which the channel member 26 is associated. The valve 40 in its full open position provides for substantially all of the air admitted to the inlet channel member to pass directly to the air propelling device for subsequent delivery therefrom to the interior of the vehicle. The valve 40 in being adaptable to positioning as desired is effective to modulate the air to be propelled by the blower inasmuch as the air by-passing around the heat exchange unit becomes admixed with the air passing through the heat exchange unit.

Through the introduction of heated and non-heated air into the blower scroll 18 by way of outlet opening 20 in casing 16 and inlet opening 22 in scroll 18 the air is made to pass through the blower and thus is thoroughly admixed permitting of the discharge of uniform temperature air either from scroll 18 by way of baffled opening 28 or by way of defroster ducting 32.

As a means of effectively controlling the positioning of valve 40 in accordance with a desired temperature of the air to be discharged from the scroll 18 of the heater, a bi-metallic thermostat control 46 is disposed in chamber 48 at a point where the air is discharged from the air blower 14. The thermostat control 46 includes a bi-metal spirally wound coil 50 attached at one end to a rotatable shaft 52, said shaft being appropriately journalled in a bearing support 54 mounted on the exterior of scroll 18. A manual control knob 56 is affixed at one end of shaft 52, whereas a wheel 58 is affixed at the opposite end of the shaft, engageable with a spring means 60 for maintaining a manual setting of the thermostat, said wheel having a plurality of like equispaced lobes 62 adapted to have interfitting and locking arrangement with a cooperative lobe 64 on spring means 60. The end of the spirally wound coil, opposite from the end attached to the shaft 52, is attached to a lever member 66 wherein with the opposite extremity of lever 66 being attached to the valve 40, movement of the coil 50 is operative to effect either an opening or a closing of the valve 40.

Through a pre-established setting of the control knob of the thermostat control 46, the valve 40 can be made to operate in accordance with the temperature of air desired to be discharged from the blower wherein when the air, being discharged from the blower, strikes the coil 50, which is in turn responsive to the temperature of the air to position the door, a modulated control of air for flow partially through the heat exchange unit and partially around the heat exchange unit, or completely through or completely by-passed around the heat exchange unit can be had depending on the thermostat control setting.

It is understandable that a low temperature setting of the thermostat control will more than likely effect a complete opening of valve 40 so that substantially all of the air is by-passed around the heater element whereas a high temperature setting of the thermostat control will cause all of the air delivered to the channel member 24 by way of inlet 36 therein to be passed through the heater element for subsequent delivery by way of the blower to the passenger compartment.

With the valve 40 so arranged in wall 38 of channel member 34 an effective temperature modulation of air to be discharged from the air blower is attained without materially affecting the volumetric flow as when the air is all passed either directly through the heat exchange unit or by-passed around said unit.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A heater apparatus comprising a casing having air inlet and discharge openings therein, a heat exchanger mounted in the casing, a partition in the casing having an opening therethrough, connected between the air inlet opening of the casing and one face of the heat exchanger, separating the inlet and discharge openings of the casing from one another, said heat exchanger having air passage means therethrough providing communication between the air inlet and discharge openings in the casing, valve means pivotal on the partition normally controlling the opening therethrough, with a pivot shaft therefor integral therewith, journalled on and disposed to one side of the opening, a scroll mounted on the casing having an air inlet opening, communicating with the discharge opening in the casing, and an air discharge opening, an air impeller mounted for rotation in the scroll, and a thermostat positioned on the scroll, including a coiled bi-metallic heat sensitive element, disposed within the interior of the scroll, adjacent the air discharge opening in the casing in the path of air flow discharged through the air discharge in the casing having the extremity at its largest diameter coupled to the pivot shaft for simultaneous movement therewith and its central axis extremity coupled to a manually adjustable post, said post extending from the interior to the exterior of the scroll on the topside thereof, said heat sensitive element operative upon the expansion thereof to actuate the valve means through the coupled arrangement of the one extremity of the heat sensitive element and the pivot shaft for the valve means.

2. A heater apparatus according to claim 1 wherein a manually controlled knob is attached at one end of the post on the outside of the scroll, wherein a star wheel is attached to the post on the inside of the scroll and wherein a spring tensioned member is engaged by the star wheel for maintaining an adjusted position of the post and control knob.

References Cited in the file of this patent

UNITED STATES PATENTS

| Number | Name | Date |
|---|---|---|
| 1,725,607 | Wolford | Aug. 20, 1929 |
| 1,825,689 | Callahan | Oct. 6, 1931 |
| 2,191,224 | Adair | Feb. 20, 1940 |
| 2,295,991 | Goldthwaite | Sept. 15, 1942 |
| 2,430,759 | Crise | Nov. 11, 1947 |
| 2,488,278 | Findley | Nov. 15, 1949 |
| 2,502,871 | Mayo | Apr. 4, 1950 |
| 2,542,317 | Faulhaber et al. | Feb. 20, 1951 |